May 6, 1952  R. M. LAYNE  2,595,961
COASTER
Filed Dec. 20, 1948
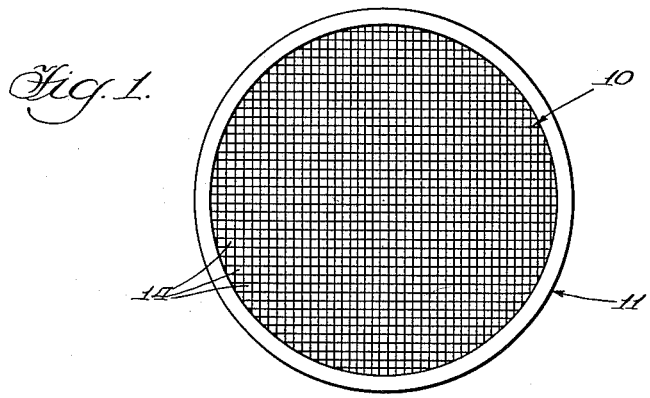
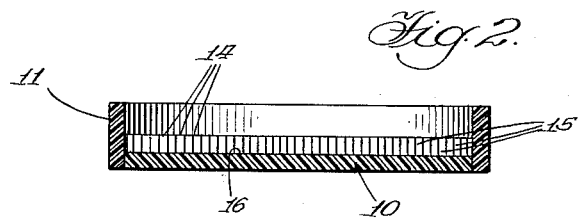
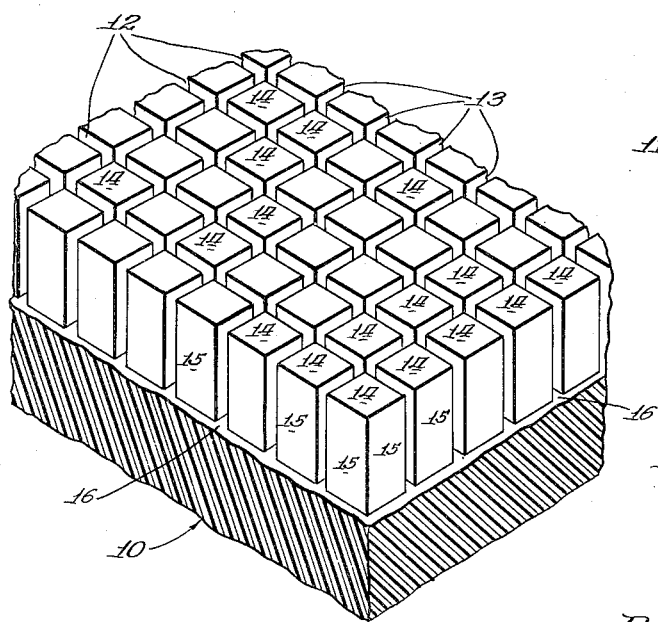
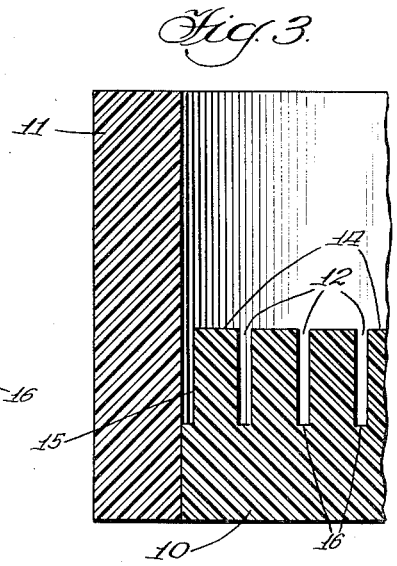
INVENTOR.
Richard M. Layne
BY
L. F. Hammard
Atty.

Patented May 6, 1952

2,595,961

UNITED STATES PATENT OFFICE 2,595,961

COASTER

Richard M. Layne, Oakland, Calif.

Application December 20, 1948, Serial No. 66,335

5 Claims. (Cl. 65—53)

The present specification discloses an improved coaster devised to deal with the problem of preventing excessive accumulation of condensation on beverage glasses.

In serving beverages, particularly iced beverages, the accumulation of condensation on the outer surface of the glass is often so rapid as to cause droplets to collect and drip from the glass when it is lifted. This is annoying and unpleasant, in addition to involving the danger of damaging clothing or marring furniture.

Many expedients have been proposed to avoid dripping, as by the provision of shallow waterproof coasters on which the glass may be placed or the provision of fabric or elastic sleeves fitted over the glass and formed of sufficiently absorptive material to take up some of the water as it condenses. These expedients have not, however, offered a completely satisfactory solution to the difficulty, since any fabric sleeves or pads soon become so saturated and soggy that they are unpleasant to handle, and if used for a continued period may even become so thoroughly soaked as to be useless for the intended purpose. Similarly, conventional coasters fall far short of achieving the optimum result desired since although they prevent the water from the bottom of the glass from flowing onto the furniture, yet the water accumulates in droplets or small pools within the coaster and when the glass is lifted and tilted the free water adhering to the bottom of the glass will drip off.

The present invention departs from the prior practices by not only providing a coaster capable of receiving the moisture from the bottom of the glass but, in addition, providing the coaster with a capillary sub-surface moisture trap, so designed that it actually attracts the individual droplets of water from the bottom of the glass and draws them downwardly away from the surface on which the glass rests, so that the bottom of the glass is left substantially dry whenever it is lifted from the coaster surface, notwithstanding the fact that considerable liquid may be contained in the coaster. The moisture trap is what may aptly be termed a capillary "maze" having a relatively large aggregate fluid capacity but divided into a multiplicity of extremely narrow grooves, slots or interstices so that the surface tension on the water spanning the capillary channels is sufficient to not only suck the droplets of water downwardly from the glass, but in addition, to hold the water in the moisture trap firmly enough so that the moisture laden coaster may even be inverted, if desired, without allowing the water to flow out. This result is accomplished by the provision of an imperforate waterproof base surface for the coaster formed with a multiplicity of closely spaced deep capillary channels running in each direction. These channels or grooves define a multiplicity of tiny pillars or fingers whose upper ends cooperate to form a supporting surface for the glass, and with capillary surfaces along their sides below the supporting surfaces. Preferably the channels are in communication with each other throughout the entire area of the coaster surface.

A preferred form of the invention is illustrated in the drawing of this specification wherein:

Figure 1 is a plan view of a coaster according to the present teachings;

Figure 2 is a central cross sectional view of the coaster of Figure 1;

Figure 3 is a greatly enlarged detail sectional view through the rim and edge of the base disc of the coaster; and Figure 4 is a greatly enlarged fragmental perspective view showing the structure of the supporting surface and moisture trap of the device.

The coaster according to these teachings consists of a generally flat disc 10 (shown as being circular in shape) which may, if desired, be provided with a marginal rim 11. In the preferred form of the invention this rim extends somewhat above the upper surface of the disc 10.

The novelty of the invention resides, however, in the specific structure of the disc as illustrated in Figures 3 and 4. This is of solid, waterproof, non-hygroscopic material, preferably of plastic; and while many plastic materials may be used satisfactory results follow the use of acrylic resins, polystyrene, cellulose acetate, phenol-formaldehyde or urea-formaldehyde materials. The surface of the disc is slotted with one set of parallel capillary grooves or channels 12 running in one direction and a similar set of channels 13 cut at right angles to the channels 12 and intersecting them to define a multiplicity of rectangular upstanding fingers or pillars having lands 14 at their upper ends to support the glass. The grooves 12 and 13 are closely spaced, however, so that these lands are individually of very small area, and for best results the channels 12 and 13 must be very narrow and of a depth greatly in excess of their width, so that the vertical capillary surfaces 15 on the adjacent fingers are spaced apart such a small distance that the surface tension of a droplet of water on the surface of the lands 14 will cause it to be drawn downwardly between the vertical surfaces 15 and to the bottom surfaces 16 of the grooves and thus carried away from the surfaces of fingers on which the glass is supported.

The slots 12 and 13 should be of a depth many times exceding their width and should be very closely spaced to each other. While slots up to $\frac{1}{32}$ of an inch in width may be used, they are preferably no more than $\frac{1}{64}$ of an inch wide, and particularly satisfactory results are obtained by employing slots of .012" or .013" width and about $\frac{1}{8}$" in depth spaced about $\frac{1}{16}$" apart on their centers. This provides a moisture trap in the form of a maze of interconnected sub-surface capillary channels extending throughout the entire area of the coaster with a substantially smooth and continuous surface on which to place the glass, yet actually with no continuous surface of as great as a $\frac{1}{16}$" exposed. This effectively prevents the accumulation of pools or droplets on the supporting surface.

The sub-surface capillary area exceeds the exposed area of the lands by a multiple of over ten to one and the individual slots each have a depth approximately ten times their width. This results in a structure in which every square inch of the glass supporting area of the coaster has about ten square inches of sub-surface area to which the water is drawn downwardly and held by capillary attraction, and while some benefits may follow the use of slots having somewhat less area than this ratio it should be at least five to one. It follows that whenever a glass is placed on the coaster surface any drops of water that might otherwise drip from the glass when it is lifted will be drawn downwardly into the moisture trap; with the result that whenever the glass is lifted from the coaster surface the bottom of the glass will be sufficiently moisture-free so that it is unlikely to accumulate enough condensation to drip before it is replaced.

In actual practice it has been determined that the coaster constructed according to the dimensions heretofore set out can accumulate several cubic centimeters of water and hold it with a sufficiently tenacious attraction so that the water will not pour from the coaster even though completely inverted, yet when, as a result of long continued use, the accumulation of water in a moisture trap approaches its limit of capacity it may be emptied by shaking or by inverting the coaster and tapping it sharply on a solid surface, so that the shock of the impact dislodges the water from between the walls of the slots. Thus it will be seen that while a coaster according to these teachings possesses all of the advantages of a high absorptive surface, yet it is entirely non-absorptive and functions by attraction of the liquid rather than by absorption. This overcomes the objection to fabric or elastic sleeves or pads since it prevents any possibility of leakage through the coaster surface, completely avoids wetting on the under side of the coaster, and at the same time provides a device in which the accumulated water may be instantly discharged. Since the coaster may be instantly emptied it can never lose its capacity to take up moisture by becoming soaked or waterlogged, but will at all times be capable of performing its intended function.

As shown, the unit is provided with an annular rim around its outer edge and with all portions of the capillary slots in communication with each other so that water entering at any point will by capillary action gradually be distributed throughout a substantial part of the surface area of the disc. It is understood, however, that while this specific form of the invention is believed to be desirable for the reasons indicated, yet certain departures may be made from the precise structure shown without sacrifice of all of the advantages therein and it should be recognized that the scope of the inventive concept is not properly limited to the precise form of invention disclosed but extends equally to any variation or modification thereof within the terms of the appended claims.

Having thus described the invention I claim:

1. In a coaster, a capillary moisture trap comprising an imperforate sheet of waterproof material having an upper exposed surface consisting of a multiplicity of separate narrow lands and deep grooves; with the grooves having a depth of at least five times their width and having an aggregate surface area exceeding the area of the lands by a multiple of at least ten to one; said grooves extending continuously across the upper surface of the coaster and having the side surfaces of their walls closely spaced whereby capillary action between the adjoining side surfaces of the grooves will withdraw droplets of water downwardly from the lands into the grooves.

2. In a coaster, a capillary moisture trap comprising an imperforate sheet of waterproof material having an upper exposed surface consisting of a multiplicity of separate narrow lands and deep grooves; with the grooves having a depth of at least five times their width and having an aggregate surface area exceeding the area of the lands by a multiple of at least ten to one; said grooves extending continuously across the upper surface of the coaster with two sets of grooves intersecting each other to form connecting sub-surface capillary channels throughout the area of the coaster surface and having the side surfaces of their walls closely spaced whereby capillary action between the adjoining side surfaces of the grooves will withdraw droplets of water downwardly from the lands into the subsurface channels and spread the water through said channels; together with a marginal rim extending above the sheet of waterproof material and closing all of the grooves at their opposite ends.

3. In a coaster, a capillary moisture trap comprising an imperforate sheet of rigid waterproof material having an upper exposed surface consisting of a multiplicity of separate very narrow lands and deep grooves; with the aggregate surface area of the lands exceeding the exposed area of the grooves and the grooves having a depth of at least five times their width and extending uninterruptedly across the upper surface of the coaster with two sets of grooves intersecting each other to define a plurality of tall slender supporting fingers spaced apart from each other to form intersecting capillary passages throughout the area of the coaster surface; the exposed upper surface of the lands being exceeded by the concealed capillary surfaces of the grooves by a multiple of at least ten to one with the wall surfaces of said grooves closely spaced and parallel, whereby capillary action between the adjoining side surfaces of the fingers will withdraw droplets of water downwardly from the lands into the subsurface channels and spread the water throughout a portion of the surrounding area; together with a marginal rim closing all of the grooves at their opposite ends.

4. In a coaster, a capillary moisture trap comprising an imperforate sheet of rigid waterproof solid material having an upper exposed surface consisting of a multiplicity of separate closely spaced lands and deep capillary grooves; with the grooves narrower than the lands but having a subsurface area more than ten times greater than the exposed area of the lands and having the side surfaces of their walls closely spaced, whereby capillary action between the adjoining side surfaces of the grooves will withdraw droplets of water downwardly from the lands into the grooves.

5. In a coaster, a capillary moisture trap comprising an imperforate sheet of rigid waterproof solid material having an exposed surface consisting of a multiplicity of separate closely spaced narrow lands and grooves, said lands and grooves having a total aggregate subsurface area of at least five square inches per square inch of the overall area of the coaster.

RICHARD M. LAYNE.

REFERENCES CITED

The following references are of record in the file of this patent:

UNITED STATES PATENTS

| Number | Name | Date |
|---|---|---|
| D. 115,636 | Sperry | July 11, 1939 |
| 34,001 | Mayall | Dec. 24, 1861 |
| 109,650 | Neefus | Nov. 29, 1870 |
| 212,497 | Perry | Feb. 18, 1879 |
| 328,995 | Andrews | Oct. 27, 1885 |
| 1,201,701 | Crane | Oct. 17, 1916 |
| 1,425,830 | Bell | Aug. 15, 1922 |
| 1,925,913 | Wood | Sept. 5, 1933 |
| 1,971,337 | Collins | Aug. 28, 1934 |
| 2,503,174 | Salvadore | Apr. 4, 1950 |

FOREIGN PATENTS

| Number | Country | Date |
|---|---|---|
| 16,358 | Switzerland | Mar. 12, 1898 |
| 16,389 | Great Britain | Sept. 2, 1895 |
| 58,881 | Switzerland | Mar. 20, 1912 |
| 206,705 | Germany | Oct. 21, 1905 |
| 542,788 | Great Britain | Jan. 27, 1942 |